United States Patent
Taneda et al.

(10) Patent No.: US 12,493,950 B2
(45) Date of Patent: Dec. 9, 2025

(54) RADIOGRAPHIC IMAGE PROCESSING APPARATUS AND COMPUTER-READABLE MEDIUM

(71) Applicant: Konica Minolta, Inc., Tokyo (JP)

(72) Inventors: Atsushi Taneda, Koganei (JP); Satoshi Hasegawa, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 465 days.

(21) Appl. No.: 17/982,666

(22) Filed: Nov. 8, 2022

(65) Prior Publication Data

US 2023/0153995 A1 May 18, 2023

(30) Foreign Application Priority Data

Nov. 12, 2021 (JP) .................................. 2021-184448

(51) Int. Cl.
*G06T 7/00* (2017.01)
*G06T 5/30* (2006.01)
(Continued)

(52) U.S. Cl.
CPC .............. *G06T 7/0012* (2013.01); *G06T 5/30* (2013.01); *G06T 7/20* (2013.01); *G06T 7/70* (2017.01);
(Continued)

(58) Field of Classification Search
CPC ............ A61B 6/00; G06T 2207/30061; G06T 2207/10081; G06T 2207/10112;
(Continued)

(56) References Cited

U.S. PATENT DOCUMENTS

| | | | | |
|---|---|---|---|---|
| 8,825,138 B2 * | 9/2014 | Mistretta | ............... | A61B 5/7207 |
| | | | | 382/128 |
| 2014/0275954 A1 * | 9/2014 | Ohta | ..................... | A61B 8/465 |
| | | | | 600/407 |

(Continued)

FOREIGN PATENT DOCUMENTS

| | | | | |
|---|---|---|---|---|
| JP | 2012000297 A | * | 1/2012 | |
| JP | 2012152624 A | | 8/2012 | |

(Continued)

OTHER PUBLICATIONS

JPO Notice of Reasons for Refusal for corresponding JP Application No. 2021-184448; Issued Mar. 4, 2025.

(Continued)

*Primary Examiner* — Utpal D Shah
*Assistant Examiner* — Jack Peter Kraynak
(74) *Attorney, Agent, or Firm* — CANTOR COLBURN LLP

(57) ABSTRACT

There is provided a radiographic image processing apparatus including: an acquirer that acquires a dynamic image including a plurality of frame images captured by a radiographic imaging apparatus; a hardware processor that determines whether or not there is an abnormality in the dynamic image by using some of the frame images of the acquired dynamic image; and a notifier that notifies of a result of the determination by the hardware processor.

19 Claims, 8 Drawing Sheets

(51) Int. Cl.
  *G06T 7/20* (2017.01)
  *G06T 7/70* (2017.01)

(52) U.S. Cl.
  CPC ............ *G06T 2207/10016* (2013.01); *G06T 2207/10116* (2013.01); *G06T 2207/30061* (2013.01); *G06T 2207/30168* (2013.01)

(58) Field of Classification Search
  CPC ............ G06T 2207/10116; G06T 5/30; G06T 2207/30168; G06T 7/0012; G06V 10/34
  See application file for complete search history.

(56) References Cited

U.S. PATENT DOCUMENTS

| | | | | |
|---|---|---|---|---|
| 2015/0078530 A1* | 3/2015 | Hawver | ............... | H04N 5/32 378/115 |
| 2018/0197290 A1* | 7/2018 | Kasai | ............... | G06T 7/74 |
| 2018/0260955 A1* | 9/2018 | Matsutani | ............... | G06T 7/38 |
| 2018/0276816 A1* | 9/2018 | Kaneko | ............... | A61B 6/507 |
| 2019/0298290 A1* | 10/2019 | Noji | ............... | A61B 6/488 |
| 2020/0018710 A1* | 1/2020 | Tezuka | ............... | G01N 23/02 |
| 2020/0074677 A1* | 3/2020 | Tezuka | ............... | G06T 7/0012 |
| 2020/0100754 A1* | 4/2020 | Uehara | ............... | H04N 23/30 |
| 2020/0110044 A1* | 4/2020 | Fukazu | ............... | G06F 3/14 |

FOREIGN PATENT DOCUMENTS

| | | | | |
|---|---|---|---|---|
| JP | 2013013737 A | | 1/2013 | |
| JP | 2013081579 A | | 5/2013 | |
| JP | 2013201724 A | * | 10/2013 | |
| JP | 2015043894 A | | 3/2015 | |
| JP | 2017202208 A | | 11/2017 | |
| JP | 2019005073 A | | 1/2019 | |
| JP | 2019219307 A | * | 12/2019 | |
| JP | 2020036694 A | | 3/2020 | |
| JP | 2020048864 A | * | 4/2020 | ........... A61B 6/5211 |
| WO | WO-2017212859 A1 | * | 12/2017 | ............... A61B 6/00 |

OTHER PUBLICATIONS

JPO Notice of Reasons for Refusal of corresponding JP Application No. 20251-184448; issued Aug. 5, 2025.

* cited by examiner

PREVIOUS IMAGE THIS TIME IMAGE

DETERMINATION TARGET REGION

RADIOGRAPHIC IMAGE PROCESSING APPARATUS AND COMPUTER-READABLE MEDIUM

CROSS-REFERENCE TO RELATED APPLICATIONS

The present invention claims priority under 35 U.S.C. § 119 to Japanese Application, 2021-184448, filed on Nov. 12, 2021, the entire contents of which being incorporated herein by reference.

BACKGROUND

Technological Field

The present invention relates to a radiographic image processing apparatus and a computer-readable medium.

Description of the Related Art

There is known a technique of determining an abnormality in each radiographic image acquired by imaging during the capturing of radiographic images.

For example, JP 2020-48864 A discloses that radiographic images generated during the capturing of moving images in which the emission of radiation and the generation of a radiographic image are repeated at high speed are acquired, it is determined whether or not there is an abnormality in each of the acquired radiographic images, and an operation at the time of abnormality, such as "stop control for emission of radiation", "delete radiographic image", "do not output to outputter", and "do not perform analysis", is performed when it is determined that there is an abnormality.

SUMMARY

In JP 2020-48864 A, the determination regarding whether or not there is an abnormality is repeated each time an image of several tens of frames per second is acquired during exposure. However, many dynamic images (moving images) have more than several hundred frames. If an image processing apparatus with low processing performance (low spec) or the like is used to determine whether or not there is an abnormality in a dynamic image, a long processing time is required. As a result, the user may not be able to check images smoothly.

It is an object of the present invention to shorten the processing time required for determining an abnormality in a captured dynamic image.

To achieve at least one of the abovementioned objects, according to an aspect of the present invention, a radiographic image processing apparatus reflecting one aspect of the present invention comprises: an acquirer that acquires a dynamic image including a plurality of frame images captured by a radiographic imaging apparatus; a hardware processor that determines whether or not there is an abnormality in the dynamic image by using some of the frame images of the acquired dynamic image; and a notifier that notifies of a result of the determination by the hardware processor.

To achieve at least one of the abovementioned objects, according to another aspect of the present invention, a non-transitory computer-readable medium reflecting one aspect of the present invention stores a program that causes a computer to perform: acquiring a dynamic image including a plurality of frame images captured by a radiographic imaging apparatus; determining whether or not there is an abnormality in the dynamic image by using some of the frame images of the acquired dynamic image; and notifying of a determination result in the abnormality determination.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein.

DETAILED DESCRIPTION OF EMBODIMENTS

Hereinafter, embodiments of the present invention will be described with reference to the diagrams. However, the technical scope of the present invention is not limited to the following embodiments and illustrated examples.

First Embodiment (Configuration of Radiographic Imaging System 100)

First, a schematic configuration of a radiographic imaging system 100 according to a first embodiment will be described.

Figure 1:
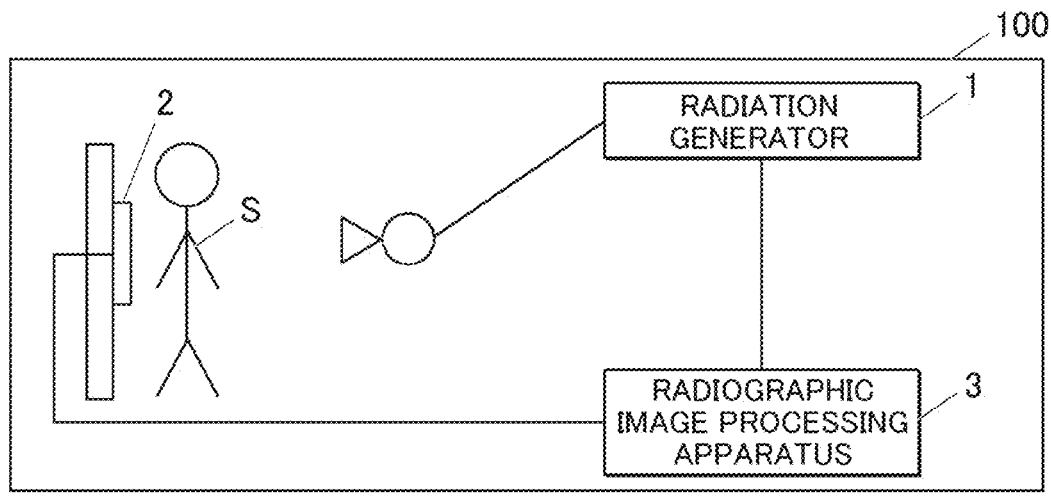
FIG. 1 is a block diagram showing an example of a radiographic imaging system according to an embodiment of the present invention.

FIG. 1 is a diagram showing an example of the overall configuration of the radiographic imaging system 100.

As shown in FIG. 1, the radiographic imaging system 100 includes a radiation generator 1, a radiation detector 2, and a radiographic image processing apparatus 3. The radiographic image processing apparatus 3 is communicably connected to the radiation generator 1 and the radiation detector 2. The radiographic image processing apparatus 3 can communicate with a hospital information system (HIS), a radiology information system (RIS), a picture archiving and communication system (PACS), a dynamic analysis device, and the like, all of which are not shown, through a communication network installed in the hospital.

Although not shown, the radiation generator 1 includes a generator that applies a voltage according to preset irradiation conditions based on the operation of an irradiation instruction switch, a radiation source that generates a dose of radiation (for example, X-rays) corresponding to the applied voltage when a voltage is applied from the generator, and the like. The radiation generator 1 generates radiation in a manner corresponding to a radiographic image to be captured.

The radiation generator 1 may be installed in the imaging room or may be configured as a medical vehicle that is movable together with the radiographic image processing apparatus 3 and the like.

Although not shown, the radiation detector 2 includes a substrate in which pixels each including a radiation detection element for generating an electric charge according to a dose upon receiving radiation and a switch element for storing and emitting an electric charge are arranged in a two-dimensional manner (in a matrix), a scanning circuit that switches ON/OFF of each switch element, a read circuit that reads the amount of electric charges emitted from each pixel as a signal value, a controller that generates a radiographic image from a plurality of signal values read by the read circuit, an output unit that outputs data of the generated radiographic image to the outside, and the like.

The radiation detector 2 may have a built-in scintillator or the like, so that the emitted radiation is converted into light having another wavelength, such as visible light, by the scintillator and an electric charge corresponding to the converted light is generated (so-called indirect type) or may directly generate an electric charge from radiation without a scintillator or the like (so-called direct type).

The radiation detector 2 may be of a dedicated machine type integrated with an imaging table or may be of a portable type (cassette type).

The radiation detector 2 generates a radiographic image corresponding to the emitted radiation in synchronization with the timing at which the radiation is emitted from the radiation generator 1 and transmits the generated radiographic image to the radiographic image processing apparatus 3.

That is, the radiation generator 1 and the radiation detector 2 form a radiographic imaging apparatus. The radiation source of the radiation generator 1 and the radiation detector 2 are arranged so as to face each other with a gap therebetween and the radiation from the radiation source is emitted to a subject S placed between the radiation source of the radiation generator 1 and the radiation detector 2, so that it is possible to take a radiographic image of the subject S and acquire a radiographic image. The radiographic imaging may be still image capturing or may be dynamic imaging in which the movement of the subject S is imaged.

Here, the still image capturing refers to acquiring one radiographic image of the subject S in response to one imaging operation (pressing of an irradiation instruction switch). The dynamic imaging refers to acquiring a plurality of radiographic images of the subject S by repeatedly emitting radiation, such as X-rays, to the subject S in a pulsed manner at predetermined time intervals (pulse irradiation) in response to one imaging operation or by continuously emitting radiation, such as X-rays, to the subject S at a low dose rate without interruption in response to one imaging operation (continuous irradiation). A series of radiographic images obtained by dynamic imaging are called a dynamic image. Each of the plurality of radiographic images forming the dynamic image is called a frame image.

The dynamic imaging includes moving image capturing but does not include capturing a still image while displaying a moving image. The dynamic image includes a moving image but does not include an image obtained by capturing a still image while displaying a moving image.

The radiographic image processing apparatus 3 has a function as a console for controlling radiographic imaging. The radiographic image processing apparatus 3 has a function of performing abnormality determination processing for determining whether or not there is an abnormality in the radiographic image transmitted from the radiation detector 2 and providing notification when it is determined that there is an abnormality.

In the present application, an image with an abnormality refers to an image that is not captured in a normal state and has an abnormal state that cannot be used for analysis or diagnosis.

Figure 2:
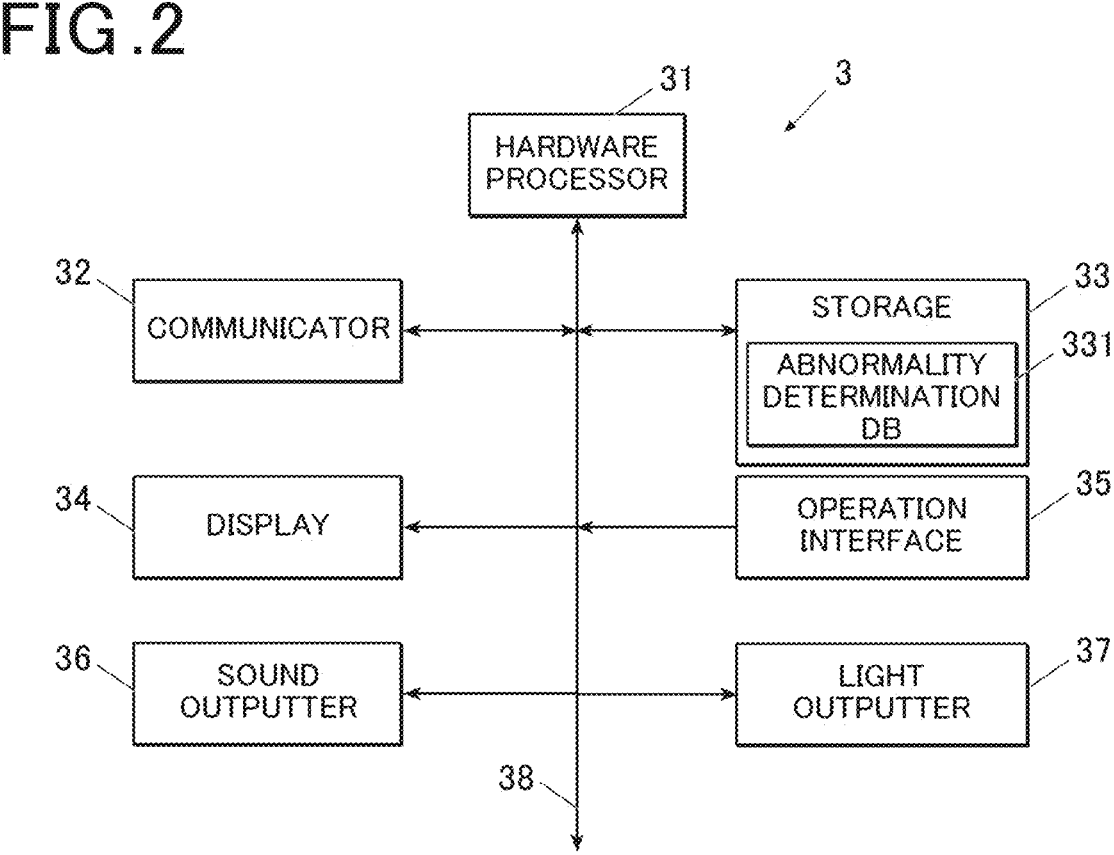
FIG. 2 is a block diagram showing the functional configuration of a radiographic image processing apparatus included in the radiographic imaging system shown in FIG. 1.

FIG. 2 is a block diagram showing the functional configuration of the radiographic image processing apparatus 3.

As shown in FIG. 2, the radiographic image processing apparatus 3 includes a controller 31 (hardware processor), a communicator 32, a storage 33, a display 34, an operation interface 35, a sound outputter 36, and a light outputter 37, all of which are connected to each other by a bus 38.

The radiographic image processing apparatus 3 may not include the display 34 or the operation interface 35, and a display device (tablet terminal or the like) including a display, or an operation interface may be connected to the radiographic image processing apparatus 3.

The controller 31 includes a central processing unit (CPU), a random access memory (RAM), and the like.

The CPU of the controller 31 centrally controls the operation of each unit of the radiographic image processing apparatus 3 by reading various programs stored in the storage 33, loading the programs to the RAM, and performing various processes according to the loaded programs. The controller 31 functions as an abnormality determiner and a thinning-out means of the present invention by performing an abnormality determination control process (abnormality determination control process A described later).

The communicator 32 is a communication module or the like.

The communicator 32 transmits and receives various signals or various kinds of data to and from the radiation generator 1, the radiation detector 2, and other external devices or systems (HIS, RIS, PACS, dynamic analysis device, and the like) connected through a communication network (a local area network (LAN), a wide area network (WAN), the Internet, and the like).

The storage 33 is a nonvolatile semiconductor memory, a hard disk, or the like, and stores various programs executed by the controller 31, parameters necessary for executing the programs, and the like.

The storage 33 also stores order information regarding examinations (each imaging included in the examinations) transmitted from the HIS, the RIS, and the like. The order information includes examination ID, examination date, patient information, clinical department (requesting clinical department), disease name, and information regarding each imaging included in the examination (imaging part and imaging direction (chest dynamic PA, abdomen dynamic PA, and the like), body position, type of analysis (ventilation, blood flow, and the like), and breathing protocol (breath-hold, quiet breathing, deep breathing, and the like)).

The storage 33 stores an imaging part and an imaging direction and imaging conditions (for example, irradiation conditions (tube current, tube voltage, irradiation time, mAs value, frame rate, and the like), reading conditions (pixel size, frame rate, and the like)) in association with each other.

Figure 3:
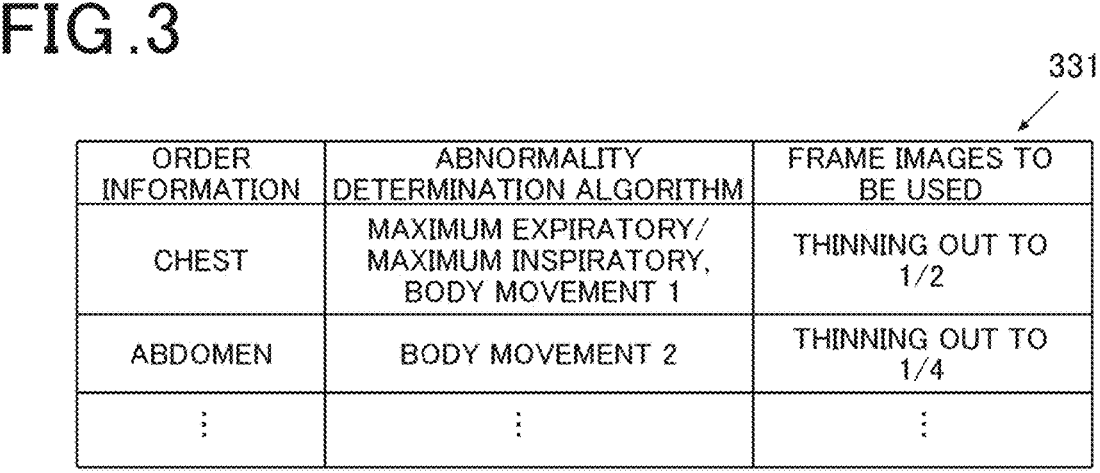
FIG. 3 is a diagram showing an example of data storage in an abnormality determination database.

The storage 33 stores an abnormality determination DB (Data Base) 331. As shown in FIG. 3, the abnormality determination DB 331 stores information (for example, respiratory medicine, chest, ventilation, . . . ) of at least one item (for example, clinical department, imaging part, analysis type, . . . ) included in the order information, the type of at least one abnormality determination algorithm used for abnormality determination of a dynamic image captured based on order information including the information, and information of frame images used at the time of abnormality determination (for example, thinning out to ½, thinning out to ¼, and frame numbers 100 to 200). The content of the abnormality determination DB 331 can be changed by the user according to the operation through the operation interface 35, for example.

The storage 33 may be able to store a radiographic image.

The display 34 is a liquid crystal display (LCD), a cathode ray tube (CRT), or the like.

The display 34 displays an examination list screen, an examination screen 341 (see, for example, FIGS. 4 and 11), notification information, and the like, based on control signals input from the controller 31. The display 34 functions as a notifier of the present invention in cooperation with the controller 31.

The operation interface 35 is an operation means configured to be operable by the user such as a keyboard including cursor keys, number input keys, and various function keys, a pointing device such as a mouse, a touch panel laminated on the surface of the display device, and the like. The operation interface 35 outputs a control signal corresponding to the operation performed by the user to the controller 31.

The sound outputter 36 includes a speaker or the like, and outputs a sound and/or voice according to the control of the controller 31. The sound outputter 36 functions as a notifier of the present invention in cooperation with the controller 31.

The light outputter 37 is a light emitting diode (LED) or the like, and outputs light according to the control of the controller 31. The light outputter 37 functions as a notifier of the present invention in cooperation with the controller 31.

(Operation of Radiographic Image Processing Apparatus 3)

Next, the operation of the radiographic image processing apparatus 3 will be described.

For example, when order information is received from the HIS, the RIS, and the like (not shown) through the communicator 32, the controller 31 stores the received order information in the storage 33 and displays the received order information on the examination list screen (not shown) of the display 34. When order information regarding an examination to be performed is selected from the examination list screen, the controller 31 causes the display 34 to display the examination screen 341.

Figure 4:
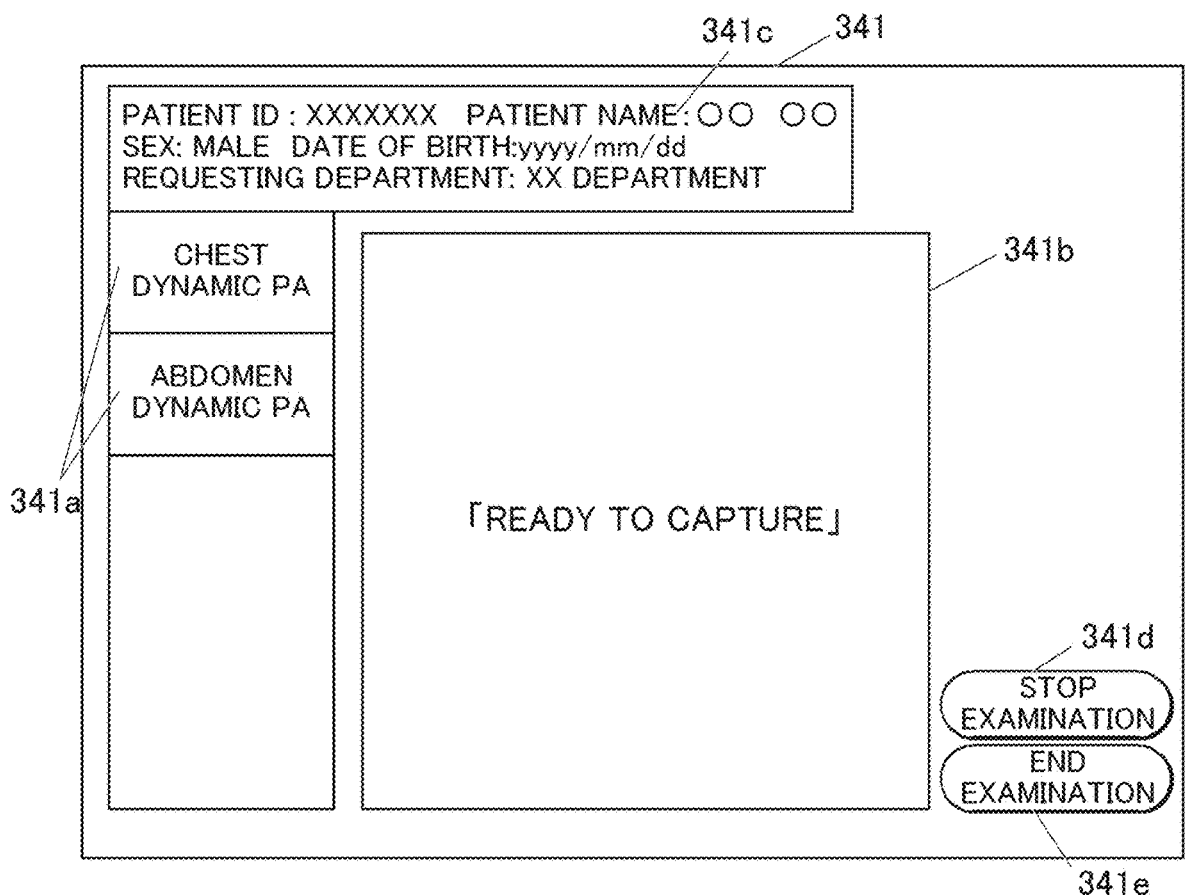
FIG. 4 is a diagram showing an example of an examination screen.

FIG. 4 is a diagram showing an example of the examination screen 341. As shown in FIG. 4, an imaging conditions button 341a, an image display region 341b, a patient information display region 341c, an examination stop button 341d, an examination end button 341e, and the like are provided on the examination screen 341.

The imaging conditions button 341a is a button corresponding to each imaging included in the order information and is a button for setting imaging conditions (irradiation conditions or reading conditions) corresponding to each imaging in the radiation generator 1 or the radiation detector 2. In order to identify each imaging included in the order information, for example, the imaging part and imaging direction of each imaging are displayed in the imaging conditions button 341a.

The image display region 341b is a region where a radiographic image acquired by radiographic imaging is displayed.

The patient information display region 341c is a region where the patient information of a patient (subject S) to be examined is displayed.

The examination stop button 341d is a button for the user (imaging operator) to give an instruction to stop the examination.

The examination end button 341e is a button for the user to give an instruction to end the examination.

The user presses the imaging conditions button 341a corresponding to radiographic imaging to be performed next on the examination screen 341 to prepare for imaging.

When any of the imaging conditions buttons 341a on the examination screen 341 is pressed by the user's operation through the operation interface 35, the controller 31 reads imaging conditions corresponding to the imaging part and imaging direction of the pressed imaging conditions button 341a from the storage 33 and transmits irradiation conditions, among the read imaging conditions, to the radiation generator 1 through the communicator 32. The controller 31 transmits reading conditions, among the read imaging conditions, to the radiation detector 2 through the communicator 32.

The radiation generator 1 sets the irradiation conditions received from the radiographic image processing apparatus 3 as irradiation conditions for the next radiographic imaging. The radiation detector 2 sets the reading conditions received from the radiographic image processing apparatus 3 as reading conditions for the next radiographic imaging.

The user positions the subject S between the radiation source of the radiation generator 1 and the radiation detector 2 and operates the irradiation instruction switch when preparations for imaging are completed. When the irradiation instruction switch is operated, the radiation generator 1 emits radiation to the subject S under the set irradiation conditions. The radiation detector 2 generates image data (frame images) of a radiographic image by accumulating and reading the emitted radiation in synchronization with the emission of radiation from the radiation generator 1 and transmits the image data to the radiographic image processing apparatus 3. When the imaging conditions corresponding to the pressed imaging conditions button 341a are dynamic imaging, the radiation generator 1 and the radiation detector 2 repeat emission of radiation and generation and transmission of frame images for a predetermined time in synchronization with each other. The radiation detector 2 attaches a frame number indicating the order of imaging to each generated frame image and transmits the generated frame image, which has a frame number attached thereto, to the radiographic image processing apparatus 3.

When a radiographic image from the radiation detector 2 is received through the communicator 32, the radiographic image processing apparatus 3 performs abnormality determination processing for determining whether or not there is an abnormality in the received radiographic image. When it is determined that there is an abnormality, the radiographic image processing apparatus 3 notifies of the fact, for example, by displaying the fact on the examination screen 341 or by outputting the fact by sound.

In the case of a still image, only one image needs to be determined. Therefore, even if the processing performance of the radiographic image processing apparatus 3 is low (spec is low), the influence on the image checking by the user is low. In the case of a dynamic image, however, a plurality of frame images (for example, one dynamic image includes several hundred frames (for example, 300 frames)). For this reason, if the abnormality determination processing is performed on all the frame images, a long processing time is required. As a result, the user cannot easily perform the next work such as image checking. Not all frame images are necessarily required to determine abnormality. For example, when there is a lung field defect, several to several tens of frame images are acquired per second. For this reason, there is a high possibility that frame images with a lung field defect will be depicted in several surrounding frames. When determining an abnormality, in general, not all frame images are required.

Figure 5:
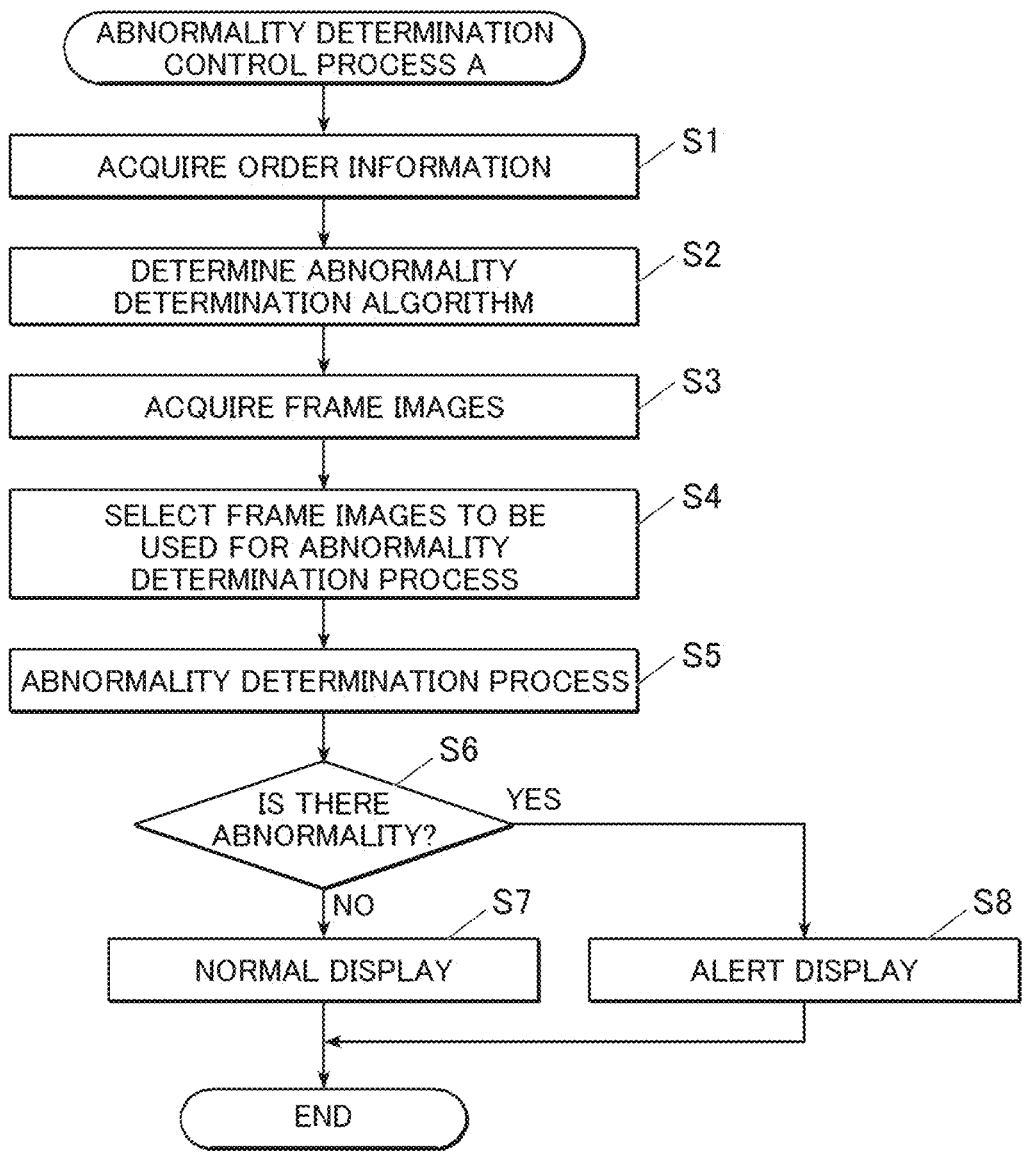
FIG. 5 is a flowchart showing the flow of an abnormality determination control process A performed by a controller shown in FIG. 2.

Therefore, when dynamic imaging is started, the controller 31 of the radiographic image processing apparatus 3 according to the present embodiment starts performing the abnormality determination control process A shown in FIG. 5, so that the processing time for abnormality determination processing on the dynamic image can be shortened compared with that in the known methods.

Hereinafter, the abnormality determination control process A will be described with reference to FIG. 5. The abnormality determination control process A is performed by cooperation between the CPU of the controller 31 and programs stored in the ROM or the storage 33.

In the abnormality determination control process A, the controller 31 first acquires order information regarding the dynamic imaging that has started (step S1) and determines an abnormality determination algorithm corresponding to the acquired order information by referring to the abnormality determination DB 331 (step S2).

Although the abnormality determination algorithm is determined based on the order information herein, the user may determine the abnormality determination algorithm according to the operation through the operation interface 35.

Then, the controller 31 sequentially acquires frame images received through the communicator 32 (step S3) and selects some frame images to be used for abnormality determination (step S4).

Figure 6:
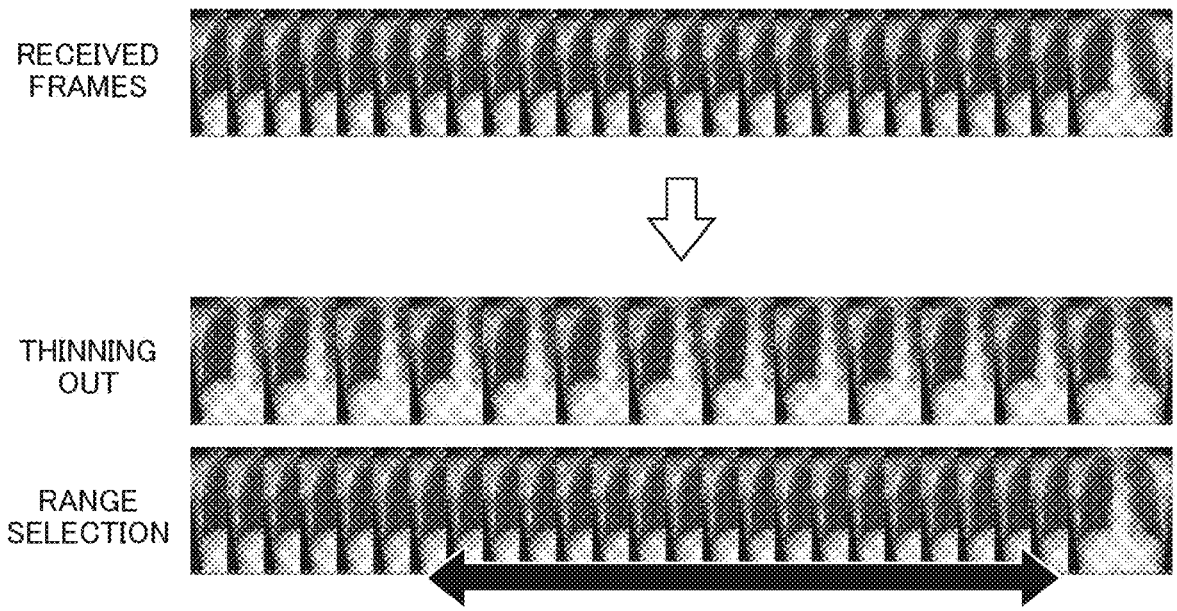
FIG. 6 is a diagram for describing a method of selecting frame images used for abnormality determination.

For example, the controller 31 acquires, from the abnormality determination DB 331, information (the number of thinning-out or a thinning-out range) of frame images to be used for abnormality determination in the abnormality determination algorithm corresponding to the order information determined in step S2 and selects some frame images to be used for abnormality determination, among the plurality of frame images of the received dynamic image, based on the acquired information. For example, as shown in FIG. 6, by thinning out the number of received frame images by a predetermined number at predetermined intervals based on the acquired information or by acquiring some frame images in a predetermined range (that is, a predetermined range of frame numbers) that are continuous in the time direction, among the received frame images, based on the acquired information, frame images to be used for abnormality determination are selected.

For example, when the information of frame images to be used for abnormality determination, which is acquired from the abnormality determination DB 331, is "thinning out to ½", the controller 31 selects frame images to be used for abnormality determination by performing thinning-out processing in which frame images sequentially received from the radiation detector 2 are acquired every other frame number (frame images that are not acquired are thinned out) to reduce the number of frame images.

For example, when the information of frame images to be used for abnormality determination, which is acquired from the abnormality determination DB 331, is "thinning out to ¼", the controller 31 selects frame images to be used for abnormality determination by performing thinning-out processing in which frame images sequentially received from the radiation detector 2 are acquired every three frame numbers (frame images that are not acquired are thinned out) to reduce the number of frame images. The number of frame images acquired every N (N is a positive integer) is not limited to one and may be plural. For example, when the information of frame images to be used for abnormality determination acquire from the abnormality determination DB 331 is "frame numbers 100 to 200", frame images in the range of frame numbers 100 to 200, among the frame images sequentially received from the radiation detector 2, are selected as frame images to be used for abnormality determination.

Frame images to be used at the time of abnormality determination may also be selected by further thinning out frame images whose frame numbers are within a predetermined range.

Then, the controller 31 performs abnormality determination processing on the selected frame images by using the abnormality determination algorithm determined in step S2 (step S5).

For example, as an abnormality determination algorithm that can be used by the radiographic image processing apparatus 3 when the imaging part is the chest, at least one of the following abnormality determination algorithms (1) to (9) is included.

(1) Frame images of the maximum expiratory position and/or the maximum inspiratory position are acquired from the selected frame images, and it is determined based on the lung field area of each of the acquired frame images whether or not there is an abnormality in the dynamic image.

For example, the reference area of the maximum inspiratory position and/or the maximum expiratory position of the general lung field or the areas of the maximum inspiratory position and the maximum expiratory position calculated from the dynamic image captured in the past for each patient (in association with patient information) are stored in the storage 33. When the difference between the lung field area of the maximum inspiratory position and/or the maximum expiratory position calculated from the selected frame images and the reference area or the previous lung field area of the same patient is equal to or greater than a predetermined threshold value, it is determined that there is an abnormality. When the above difference is less than the threshold value, it is determined that there is no abnormality.

For example, when the lung field area of the maximum inspiratory position is smaller than the reference area of the maximum inspiratory position or the lung field area of the previous maximum inspiratory position of the same patient by a predetermined threshold value or more, it is determined that there is an abnormality because adequate breathing is not possible (inhaling is not sufficient). For example, when the lung field area of the maximum expiratory position is larger than the reference area of the maximum expiratory position or the lung field area of the previous maximum expiratory position of the same patient by a predetermined threshold value or more, it is determined that there is an abnormality adequate breathing is not possible (exhaling is not sufficient).

The lung field area can be calculated, for example, based on the pixel size and the number of pixels of a lung field region recognized from the selected frame images. Although the method of recognizing the lung field region is not particularly limited, the recognition of the lung field region can be performed by using, for example, image processing such as edge detection, deep learning, and machine learning using teacher data.

(2) The amount of change (the amount of change in position) in the diaphragm or ribcage is calculated from the selected frame images, and it is determined based on the calculated amount of change whether or not there is an abnormality in the dynamic image.

For example, the diaphragm or ribcage is extracted from each of the selected frame images, and a predetermined position of the extracted diaphragm, such as the coordinate (y-coordinate) of the highest position, or a predetermined position of the extracted ribcage, such as the coordinate (x-coordinate) of the outermost position, is acquired. Then, for example, assuming that the difference between the frame image with the smallest coordinate value and the frame image with the largest coordinate value is the amount of change, it is determined that there is an abnormality in the dynamic image when the amount of change is equal to or less than a predetermined threshold value, and it is determined that there is no abnormality in the dynamic image when the amount of change is larger than the threshold value.

As for the diaphragm, for example, the lower edge portion of the recognized lung field region can be extracted as the diaphragm. As for the ribcage, for example, the edge portion of the outer contour of the recognized lung field region can be extracted as the ribcage.

The abnormality determination algorithms (1) and (2) described above are for determining that there is an abnormality when it is not possible to perform respiratory movements necessary for diagnosis. Therefore, it is preferable not to apply the abnormality determination algorithms (1) and (2) to patients who have or are suspected of having certain diseases that do not allow adequate breathing. For example, when the order information includes a predetermined disease name, it is preferable that the controller 31 performs control so as not to apply the abnormality determination algorithms (1) and (2).

(3) The tilt angle of the subject S is calculated by using the selected frame images, and it is determined based on the calculated tilt angle whether or not there is an abnormality in the dynamic image.

Figure 7:
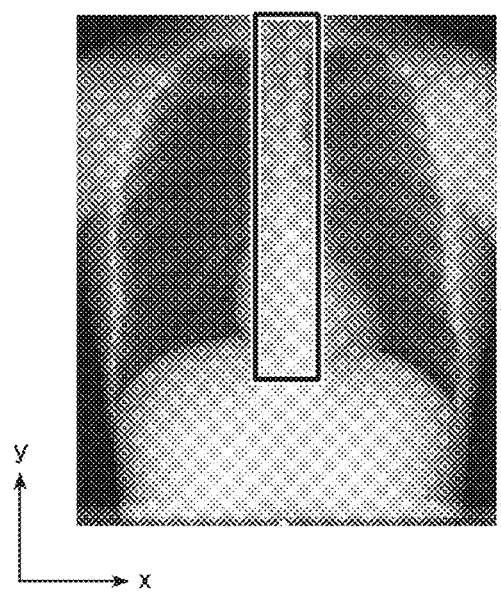
FIG. 7 is a diagram for describing the extraction of the spine.

For example, as shown in FIG. 7, the spine (indicated by a rectangle in FIG. 7) is extracted from one of the selected frame images. If the extraction of the spine is successful, the tilt angle of the extracted spine with respect to the vertical direction (y direction) is calculated. If the tilt angle exceeds a predetermined range (for example, ±10°), it is determined that there is an abnormality. If the tilt angle is within the range, it is determined that there is no abnormality. If the extraction of the spine fails, the extraction of the spine from the next selected frame image is performed. If the extraction of the spine is successful, the tilt angle of the extracted spine with respect to the vertical direction is calculated. If the tilt angle exceeds a predetermined range (for example, ±10°), it is determined that there is an abnormality. If the tilt angle is within the range, it is determined that there is no abnormality. The extraction of the spine can be performed by using, for example, image processing such as edge detection.

In the abnormality determination algorithm (3), if the subject S is tilted by a predetermined threshold value or more, an abnormality may occur when performing the dynamic analysis. Therefore, it is determined that there is an abnormality when the tilt angle of the subject S is equal to or greater than the predetermined threshold value. In this example, the presence or absence of abnormality is determined only from one frame image from which the spine has been successfully extracted, but the presence or absence of abnormality may be determined from a plurality of frame images.

Displacement of the subject's posture during imaging affects the dynamic analysis or diagnosis. For this reason, the extraction of the spine from a predetermined frame image, for example, a first frame image, among the selected frame images, may be performed to measure the tilt angle (if the spine cannot be extracted, for example, the tilt angles of frame images with successively smaller frame numbers are measured), and the tilt angle may be set as a reference tilt angle. The tilt angle of the spine in the other selected frame images may be compared with the reference tilt angle, and it may be determined that there is an abnormality when the tilt angle is equal to or greater than a predetermined threshold value.

(4) The amount of change in a predetermined structure (for example, diaphragm position or lung field area) or the amount of change in image signal value within a predetermined structure region (for example, within a lung field region) is calculated by using the selected frame images, the calculated amount of change is compared with a threshold value set in advance for the breathing protocol (breathing state (breath-hold, deep breathing, quiet breathing, and the like) to be imaged), and it is determined based on the comparison result whether or not there is an abnormality in the dynamic image (threshold value: breath-hold<quiet breathing<deep breathing). With this algorithm, it is possible to determine that there is an abnormality when breathing motion conforming to the breathing protocol is not performed.

Figure 8:
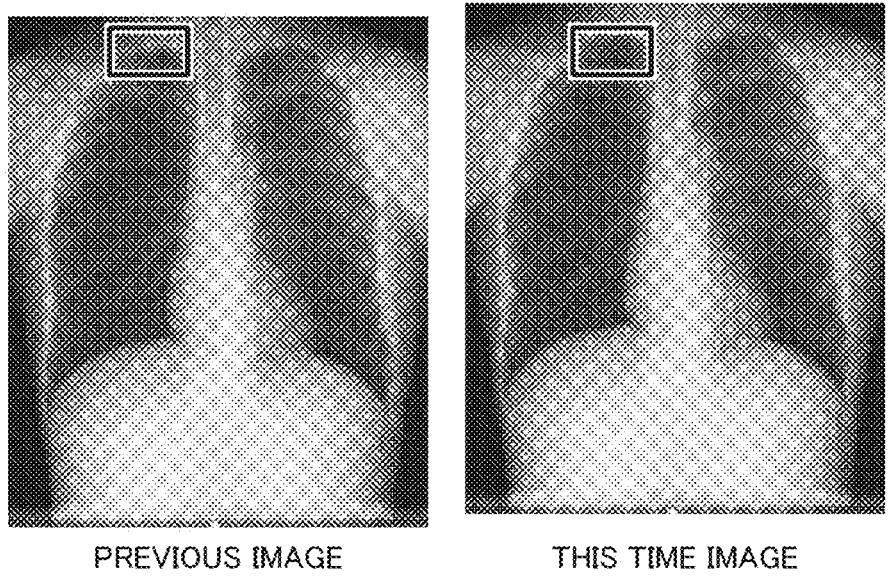
FIG. 8 is a diagram for describing calculation of the amount of change in lung apex position.

(5) The position of the lung apex (indicated by a rectangle in FIG. 8) is specified from the selected frame image. When the amount of change from the position of the lung apex of the frame image (previous image) with the closest frame number is equal to or greater than a predetermined threshold value, it is determined that there is an abnormality in the dynamic image. When the amount of change is less than the predetermined threshold value, it is determined that there is no abnormality. As for the position of the lung apex, for example, the highest position of the lung field region can be specified as the position of the lung apex. Since the lung apex is a location where movement is unlikely to occur, it can be determined that body movement has occurred when there is a positional change equal to or greater than a predetermined threshold value.

(6) Processing for detecting foreign matter (gauze or the like) and/or metal artifacts from the selected frame images is performed. When foreign matter and/or metal artifacts are detected, it is determined that there is an abnormality in the dynamic image. When foreign matter and/or metal artifacts are not detected, it is determined that there is no abnormality in the dynamic image. Any known technique may be used to detect foreign matter or metal artifacts. For example, foreign matter can be detected by using deep learning or machine learning using teacher data. Metal artifacts can be detected by, for example, binarization processing or graph cut processing that is advanced region extraction processing. Therefore, it is possible to detect abnormalities due to contamination by foreign matter or metal artifacts.

(7) The lung field region and the scapula are recognized from the selected frame images, and it is determined whether or not there is an abnormality in the dynamic image based on the positional relationship between the recognized scapula and lung field region (whether or not the recognized scapula and lung field region overlap each other). This is because, in the dynamic analysis, accurate analysis cannot be performed if the scapula covers the lung field region. Any known method may be used to detect the scapula. For example, the scapula can be detected by using deep learning or machine learning using teacher data.

(8) It is determined from the selected frame images whether or not a lung field defect has occurred. When it is determined that a lung field defect has occurred, it is determined that there is an abnormality in the dynamic image. When it is determined that a lung field defect has not occurred, it is determined that there is no abnormality. For example, if the lung field region does not fall within the irradiation field region, it is determined that a lung field defect has occurred.

(9) It is determined from the selected frame images whether there is an excess or deficiency of radiation dose. When it is determined that there is an excess or deficiency of radiation dose, it is determined that there is an abnormality in the dynamic image. When it is determined that there is no excess or deficiency of radiation dose, it is determined that there is no abnormality in the dynamic image. Although not particularly limited, whether or not there is an excess or deficiency of radiation dose can be determined, for example, by comparing the average value or median value of the image signal values within a region of interest (for example, the lung field in the case of the chest), which is set in advance for each imaging part, with a predetermined threshold value.

(10) It is determined from the selected frame images whether or not there is body movement of the subject. When it is determined that there is body movement of the subject, it is determined that there is an abnormality in the dynamic image. When it is determined that there is no body movement of the subject, it is determined that there is no abnormality in the dynamic image. The method for determining whether or not there is body movement of the subject is not particularly limited, but, for example, a method of performing determination based on the above-described amount of change in the position of the lung apex can be used.

Figure 9:
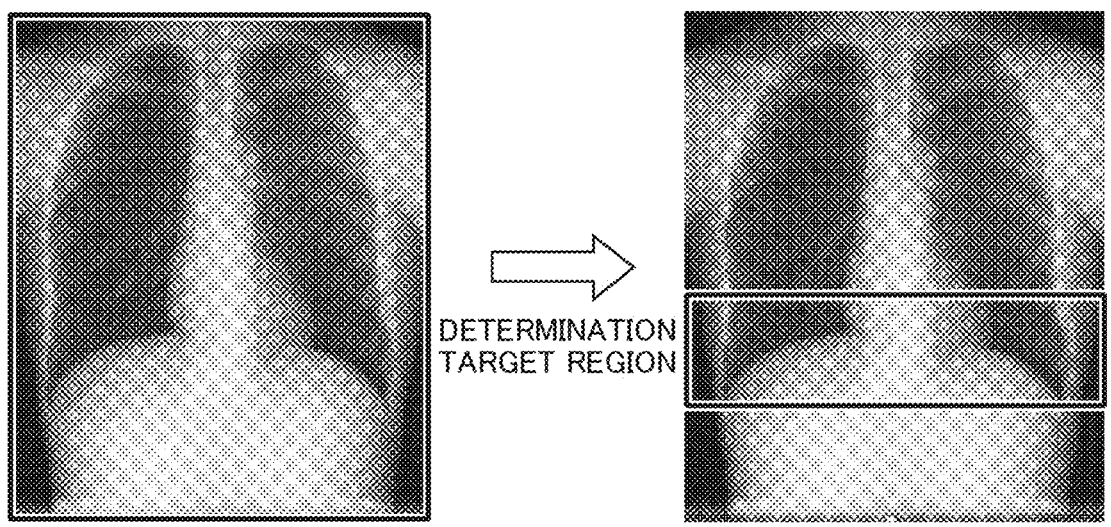
FIG. 9 is a diagram for describing the setting of a determination target region.

When performing abnormality determination processing, as shown in FIG. 9, the controller 31 may set a region of a part of the selected frame image as a determination target region and perform the abnormality determination processing by using the image of the determination target region. The determination target region may be determined in advance according to the type of abnormality determination algorithm or may be designated by the user's operation through the operation interface 35. Therefore, it is possible to further shorten the time required for the abnormality determination processing. The determination target region may be a plurality of regions.

Figure 10:
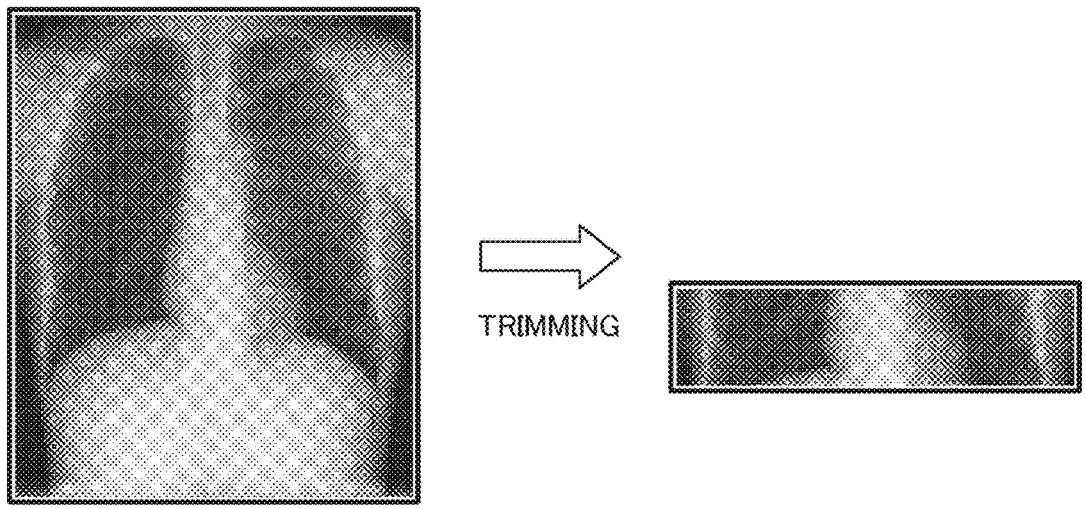
FIG. 10 is a diagram for describing trimming.

Alternatively, as shown in FIG. 10, the controller 31 may reduce each of the selected frame images by trimming before performing abnormality determination and perform the abnormality determination processing by using the reduced image. For example, trimming is performed so that only the determination target region described above is left. Therefore, it is possible to further shorten the time required for the abnormality determination processing.

The controller 31 may perform pre-processing, such as gradation processing or frequency processing, on the selected frame images before performing the abnormality determination processing.

Then, the controller 31 determines whether or not it has been determined by the abnormality determination processing that there is an abnormality in the dynamic image (step S6).

When it is determined that there is no abnormality in the dynamic image (step S6; NO), the controller 31 normally displays the dynamic image on the display 34 (step S7), and ends the abnormality determination control process A. For example, the dynamic image is displayed in the image display region 341b of the examination screen 341.

When it is determined that there is an abnormality in the dynamic image (step S6; YES), the controller 31 displays (informs) an alert indicating that there is an abnormality in the dynamic image on the display 34 (step S8), and ends the abnormality determination control process A. For the alert, a sound may be output from the sound outputter 36, or light may be output from the light outputter 37.

Figure 11:
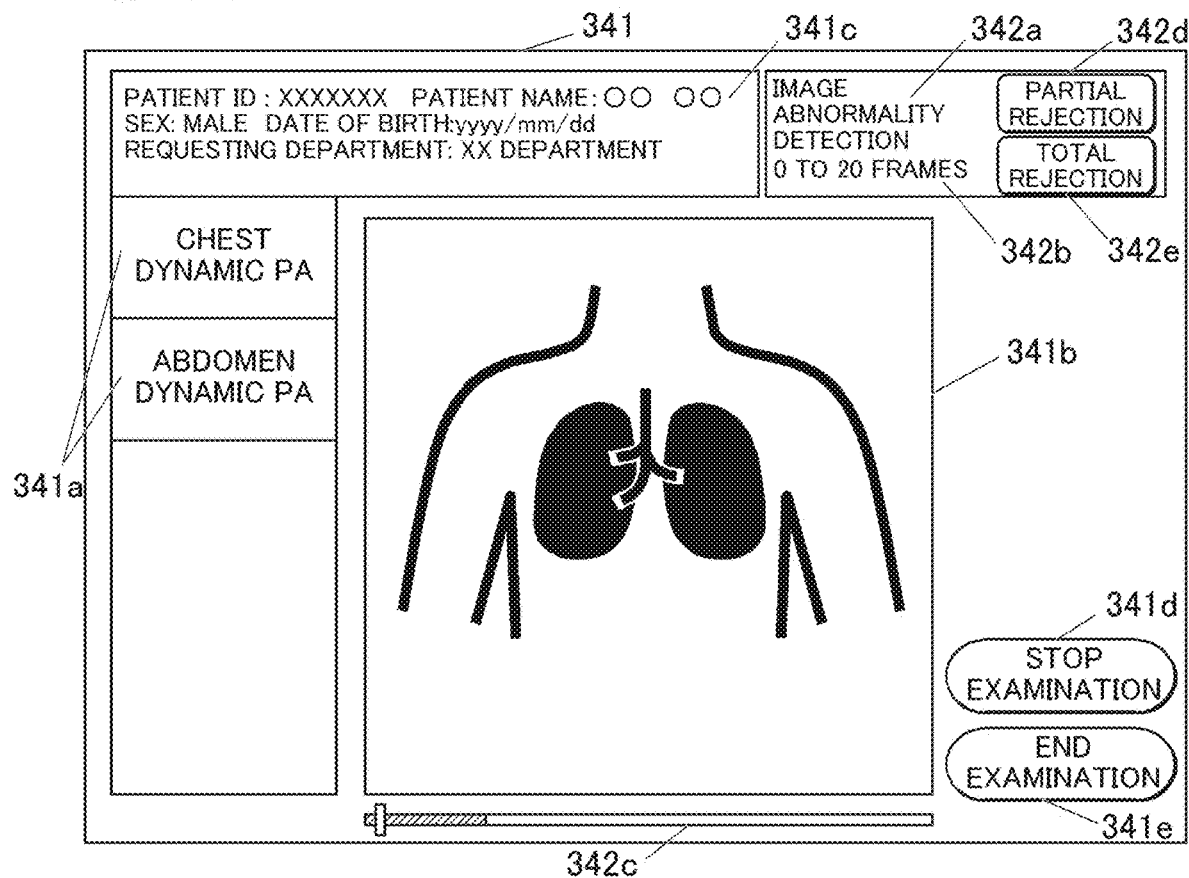
FIG. 11 is a diagram showing an example of an examination screen on which an alert is displayed.

FIG. 11 is a diagram showing an example of the examination screen 341 on which an alert is displayed.

For example, when it is determined that there is an abnormality, the controller 31 displays a message 342a indicating that an abnormality has been detected, as an alert to notify of the fact, on the examination screen 341. The alert may be output from the sound outputter 36 or the light outputter 37. Alternatively, an icon indicating that an abnormality has been detected may be displayed. Therefore, the user can easily recognize that there is an abnormality in the dynamic image obtained by dynamic imaging. A frame image determined to have an abnormality may be displayed in the image display region 341b of the examination screen 341. Alternatively, the frame number 342b of a frame image determined to have an abnormality may be displayed on the examination screen 341. Alternatively, the vicinity of the position of the image determined to have an abnormality in a seek bar (playback bar) 342c displayed at the bottom of the image display region 341b may be highlighted by adding color.

When it is determined that there is an abnormality in the dynamic image, the controller 31 may display a partial rejection button 342d and a total rejection button 342e on the examination screen 341.

When the partial rejection button 342d is pressed, the controller 31 automatically rejects only the frame image in which an abnormality is detected (for example, deletes only the frame image in which an abnormality is detected from the storage 33). Alternatively, when the partial rejection button 342d is pressed, a pop-up screen for the user to specify the range to be rejected may be displayed, and the range specified by the user may be rejected. A dynamic image including other frame images may be stored in the storage 33 or output to a predetermined output destination, such as a PACS or a dynamic analysis device, through the communicator 32 in a state in which the dynamic image is attached to patient information or examination information (information of predetermined items in order information).

When the total rejection button 342e is pressed, the controller 31 dynamically rejects all frame images of the dynamic image (for example, deletes all frame images of the dynamic image from the storage 33). In this case, re-imaging is possible. For example, when the imaging conditions button 341a corresponding to the performed imaging is pressed, the imaging conditions are set again in the radiation generator 1 and the radiation detector 2, and imaging becomes possible in response to the pressing of the irradiation instruction button.

A rejected image may be output to a predetermined output destination (for example, a management device for managing rejected images) together with a flag indicating a rejected image.

When it is determined that some of the selected frame images have abnormalities, the controller 31 may immediately (in real time) perform the alert display of step S8 or may perform the alert display of step S8 after the end of the abnormality determination processing on all of the selected frame images. For example, based on the difference between the value used for determining whether or not there is an abnormality and the threshold value, it may be determined whether to display an alert in real time or to collectively issue an alert after the end of the abnormality determination processing. When it is determined that some of the selected frame images have abnormalities, the alert display of step S8 is immediately performed, so that the user can immediately (in real time) recognize that there is an abnormality in the captured image.

Figure 12:
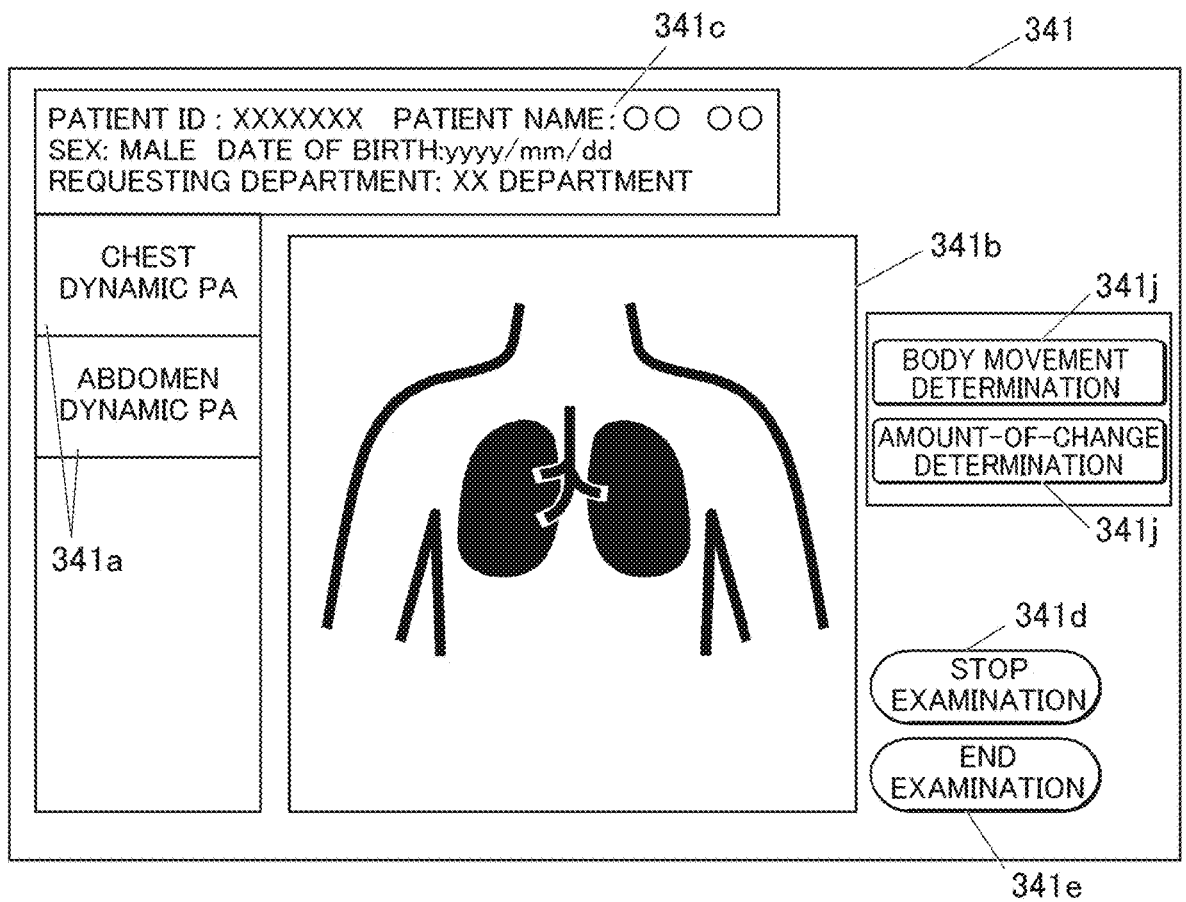
FIG. 12 is a diagram showing an example of an examination screen on which a selection button for selecting an abnormality determination algorithm used for the next abnormality determination is displayed.

After the end of the abnormality determination processing, as shown in FIG. 12, the controller 31 may cause the display 34 to display a selection button 341*j* for giving an instruction to perform abnormality determination processing based on an abnormality determination algorithm other than the abnormality determination algorithm used in step S5. Then, the controller 31 may additionally perform abnormality determination processing based on another abnormality determination algorithm, which is selected in response to the pressing of the selection button 341*j* by the operation interface 35, on the dynamic image. Alternatively, abnormality determination processing based on another abnormality determination algorithm, which is set in advance, other than the abnormality determination algorithm used in step S5 may be automatically performed. As a result, real-time performance can be emphasized, and the time-consuming abnormality determination processing can be postponed.

In this manner, since the controller 31 of the radiographic image processing apparatus 3 performs abnormality determination of a dynamic image captured by using some of the plurality of frame images forming the dynamic image, the abnormality determination can be performed with a low load. Therefore, it is possible to shorten the processing time required for determining an abnormality in the dynamic image. As a result, even if the radiographic image processing apparatus 3 is a low-spec apparatus with low processing performance, the processing time required for the abnormality determination processing can be reduced and accordingly, the user can quickly check the image or perform re-imaging.

Second Embodiment

Next, a second embodiment of the present invention will be described.

In the second embodiment, when the reception of frame images of a dynamic image from the radiation detector 2 through the communicator 32 starts, the controller 31 of the radiographic image processing apparatus 3 thins out the frame images for image checking (for example, thins out to 2 fps) in parallel with imaging, and performs simpler image processing than for the main images used for diagnosis, and sequentially displays the frame images obtained by thinning-out on the display 34 (for example, an image display region 241*b* of an examination screen 241). This frame image subjected to simple image processing for image checking is referred to as a live view image. In the second embodiment, a case will be described in which abnormality determination processing is performed by using the live view image.

Since the configurations of the radiographic imaging system 100 and each device in the second embodiment are the same as those described in the first embodiment, the description is cited, and the operation of the radiographic image processing apparatus 3 according to the second embodiment will be described.

Figure 13:
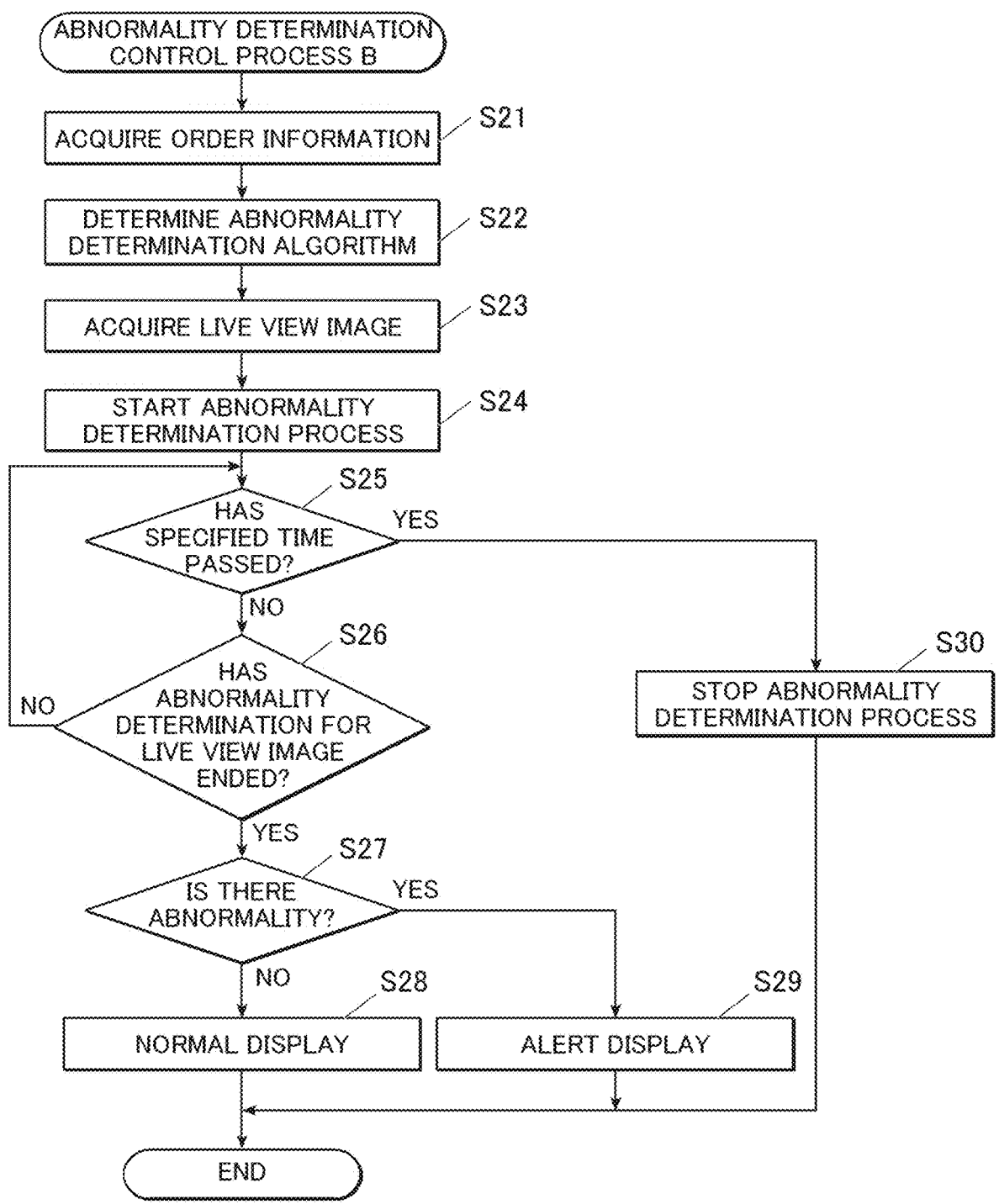
FIG. 13 is a flowchart showing the flow of an abnormality determination control process B performed by the controller shown in FIG. 2 in a second embodiment.

FIG. 13 is a flowchart showing the flow of an abnormality determination control process (referred to as an abnormality determination control process B) in the second embodiment. The abnormality determination control process B is performed by cooperation between the CPU of the controller 31 and programs stored in the ROM or the storage 33.

In the abnormality determination control process B, the controller 31 first acquires order information regarding the dynamic imaging that has started (step S21) and determines an abnormality determination algorithm corresponding to the acquired order information by referring to the abnormality determination DB 331 (step S22).

Since the processes of steps S21 and S22 are the same as those of steps S1 and S2 in FIG. 5, the description is cited.

Then, the controller 31 acquires live view images (step S23).

As described above, the controller 31 generates live view images in parallel with imaging. The controller 31 acquires the generated live view images for abnormality determination. As described above, in the live view images, the number of frame images has already been reduced. It is also possible to further thin out the live view images.

Then, the controller 31 starts abnormality determination processing on the live view images by using the abnormality determination algorithm determined in step S22 (step S24).

Since the process of step S24 is the same as that described in step S5 of FIG. 5 except that the frame image used in the process is a live view image, the description is cited.

Then, the controller 31 determines whether or not a specified time set in advance has passed from the start of the abnormality determination processing (step S25).

When it is determined that the specified time has not passed (step S25; NO), the controller 31 determines whether or not the abnormality determination processing on the last live view image has ended (step S26).

When it is determined that the abnormality determination processing on the last live view image has not ended (step S26; NO), the controller 31 returns to step S25.

When it is determined that the abnormality determination processing on the last live view image has ended (step S26; YES), the controller 31 determines whether or not it has been determined by the abnormality determination processing that there is an abnormality in the dynamic image (step S27).

When it is determined that there is no abnormality in the dynamic image (step S27; NO), the controller 31 continues the normal display of the live view image on the display 34 (step S28), and ends the abnormality determination control process B. For example, the display of the live view image in the image display region 341*b* of the examination screen 341, which has already been performed, is continued.

When it is determined that there is an abnormality in the live view image (step S27; YES), the controller 31 displays an alert indicating that there is an abnormality in the dynamic image on the display 34 together with the live view image (step S29), and ends the abnormality determination control process B. Since the alert display is the same as that described in the first embodiment, the description is cited.

Also in the second embodiment, as shown in FIG. 11, a partial rejection button 342d and a total rejection button 342e may be displayed on the examination screen 341, and a part or entirety of the dynamic image may be rejected in response to the pressing of the partial rejection button 342d or the total rejection button 342e as in the first embodiment. As shown in FIG. 12, the selection button 341j may be displayed on the examination screen 341, and an abnormality determination based on an abnormality determination algorithm different from the executed abnormality determination processing, which is selected in response to the pressing of the selection button 341j, may be performed. A resume button or the like may be displayed so that the stopped abnormality determination processing can be resumed according to the user's operation when the abnormality determination processing is stopped on the way.

On the other hand, when it is determined that a specified time set in advance has passed from the start of the abnormality determination processing in step S25 (step S25; YES), the controller 31 stops the abnormality determination processing (step S30), and ends the abnormality determination control process B.

As described above, in the second embodiment, the abnormality determination processing is performed by using the live view images generated for image checking, which are obtained by thinning out the frame images of the dynamic image and performing simple processing. This can contribute to real-time abnormality determination. When the processing time for the abnormality determination processing exceeds the specified time, the abnormality determination processing is stopped. Therefore, if the abnormality determination processing takes too much time, the determination can be stopped on the way to allow the user's operation.

As described above, according to the radiographic image processing apparatus 3, the controller 31 acquires a dynamic image including a plurality of frame images captured by the radiographic imaging apparatus and determines whether or not there is an abnormality in the dynamic image by using some of the frame images of the acquired dynamic image. For example, thinning-out processing for reducing the number of frame images of the dynamic image is performed, and it is determined whether or not there is an abnormality in the dynamic image by using the frame images after the thinning-out processing. Alternatively, it is determined whether or not there is an abnormality in the dynamic image by using some frame images in a predetermined range that are continuous in the time direction of the dynamic image.

Therefore, since the abnormality determination can be performed with a low load, it is possible to shorten the processing time required for determining an abnormality in the dynamic image. As a result, even if the radiographic image processing apparatus 3 is a low-spec apparatus with low processing performance, the processing time required for the abnormality determination processing can be reduced and accordingly, the user can quickly check the image or perform re-imaging.

For example, the controller 31 determines the number of frame images to be thinned out based on the order information regarding the capturing of the dynamic image. Therefore, it is possible to determine the optimal number of frame images according to, for example, an imaging part, a clinical department, and the type of analysis included in the order information.

For example, the controller 31 determines whether or not there is an abnormality in the dynamic image by using a live view image generated for checking the dynamic image captured by the radiographic imaging apparatus. Therefore, it is possible to contribute to real-time abnormality determination.

For example, the controller 31 stops the determination processing when the processing time for the process of determining whether or not there is an abnormality in the dynamic image exceeds a specified time. Therefore, if the abnormality determination processing takes too much time, the determination can be stopped on the way to allow the user's operation.

For example, after determining whether or not there is an abnormality in the dynamic image by using one of a plurality of types of abnormality determination algorithms, additional abnormality determination can be performed by using another abnormality determination algorithm. Therefore, real-time performance can be emphasized, and the time-consuming abnormality determination processing can be postponed.

Since the controller 31 determines whether or not there is an abnormality in the dynamic image by using a partial determination target region of each of some of the frame images of the dynamic image, it is possible to further shorten the time required for the abnormality determination processing.

The controller 31 reduces each of some of the frame images of the dynamic image by trimming and determines whether or not there is an abnormality in the dynamic image by using the reduced images. Therefore, it is possible to further shorten the time required for the abnormality determination processing.

The radiographic image processing apparatus 3 includes the abnormality determination DB 331 that stores information of at least one item included in the order information regarding imaging and at least one of a plurality of types of abnormality determination algorithms so as to be associated with each other. The controller 31 determines an abnormality determination algorithm to be applied to the dynamic image based on the order information regarding the capturing of the dynamic image and the abnormality determination DB 331 and determines whether or not there is an abnormality in the dynamic image by using the determined abnormality determination algorithm. Therefore, it is possible to execute the abnormality determination algorithm according to, for example, an imaging part, a clinical department, and the type of analysis.

When it is determined that there is an abnormality in the dynamic image, the controller 31 outputs a message or an icon for notifying of the fact. Therefore, it is possible to make the user recognize that there is an abnormality in the dynamic image.

There is provided an operation means for the user to give an instruction to reject some or all of the frame images of the dynamic image when the controller 31 determines that there is an abnormality in the dynamic image. Therefore, the user can give an instruction to reject some or all of the frame images of the dynamic image.

The description in each of the above embodiments is a preferable example of the radiographic image processing apparatus according to the present invention, and the present invention is not limited thereto.

In the above description, an example is disclosed in which a hard disk, a semiconductor non-volatile memory, or the like is used as a computer-readable medium according to the present invention, but the present invention is not limited to this example. As other computer-readable media, a portable recording medium, such as a CD-ROM, can be applied. A carrier wave is also applied as a medium for providing data of a radiographic image display program according to the present invention through a communication line.

The detailed configuration and detailed operation of each device included in the radiographic image processing apparatus can also be appropriately changed without departing from the spirit of the invention.

Although embodiments of the present invention have been described and illustrated in detail, the disclosed embodiments are made for purposes of illustration and example only and not limitation. The scope of the present invention should be interpreted by terms of the appended claims.

What is claimed is:

1. A radiographic image processing apparatus, comprising:
   an acquirer that acquires a dynamic image including a plurality of frame images captured by a radiographic imaging apparatus;
   a hardware processor that determines whether or not there is an abnormality in the dynamic image by using some of the frame images of the acquired dynamic image; and
   a notifier that notifies of a result of the determination by the hardware processor;
   wherein the hardware processor thins out the frame images of the dynamic image and determines whether or not there is an abnormality in the dynamic image by using the frame images after the thinning-out; and
   wherein the hardware processor determines the number of frame images to be thinned out based on order information regarding capturing of the dynamic image.

2. The radiographic image processing apparatus according to claim 1,
   wherein the hardware processor determines whether or not there is an abnormality in the dynamic image by using some frame images in a predetermined range that are continuous in a time direction among the plurality of frame images of the dynamic image.

3. The radiographic image processing apparatus according to claim 1,
   wherein the hardware processor determines whether or not there is an abnormality in the dynamic image by using a live view image generated for checking the dynamic image captured by the radiographic imaging apparatus.

4. The radiographic image processing apparatus according to claim 3,
   wherein, when a processing time for processing for determining whether or not there is an abnormality in the dynamic image exceeds a specified time, the hardware processor stops the processing.

5. The radiographic image processing apparatus according to claim 1,
   wherein the hardware processor performs the determination by using at least one of a plurality of types of abnormality determination algorithms, and
   the hardware processor determines whether or not there is an abnormality in the dynamic image by using one of the abnormality determination algorithms and then performs additional abnormality determination by using another abnormality determination algorithm.

6. The radiographic image processing apparatus according to claim 1,
   wherein the hardware processor determines whether or not there is an abnormality in the dynamic image by using a partial determination target region of each of some of the frame images of the dynamic image.

7. The radiographic image processing apparatus according to claim 1,
   wherein the hardware processor reduces each of some of the frame images of the dynamic image by trimming and determines whether or not there is an abnormality in the dynamic image by using the reduced images.

8. The radiographic image processing apparatus according to claim 1, further comprising:
   a database that stores information of at least one item included in order information regarding imaging and at least one of a plurality of types of abnormality determination algorithms so as to be associated with each other,
   wherein the hardware processor determines an abnormality determination algorithm to be applied to the dynamic image based on the associated order information in the database.

9. The radiographic image processing apparatus according to claim 1,
   wherein abnormality determination algorithms usable by the hardware processor in the determination include an algorithm in which frame images of a maximum expiratory position and/or a maximum inspiratory position are acquired from some of the plurality of frame images of the dynamic image, and it is determined based on a lung field area of each of the acquired frame images whether or not there is an abnormality in the dynamic image.

10. The radiographic image processing apparatus according to claim 1,
    wherein abnormality determination algorithms usable by the hardware processor in the determination include an algorithm in which an amount of change in a position of a diaphragm or a ribcage is acquired from some of the plurality of frame images of the dynamic image, and it is determined based on the acquired amount of change whether or not there is an abnormality in the dynamic image.

11. The radiographic image processing apparatus according to claim 1,
    wherein abnormality determination algorithms usable by the hardware processor in the determination include an algorithm in which a tilt angle of a subject is acquired from some of the plurality of frame images of the dynamic image, and it is determined based on the acquired tilt angle whether or not there is an abnormality in the dynamic image.

12. The radiographic image processing apparatus according to claim 1,
    wherein abnormality determination algorithms usable by the hardware processor in the determination include an algorithm in which an amount of change in a predetermined structure or an amount of change in image signal value within a predetermined structure region is calculated from some of the plurality of frame images of the dynamic image, the calculated amount of change is compared with a threshold value set in advance for a breathing protocol at the time of imaging, and it is determined based on a result of the comparison whether or not there is an abnormality in the dynamic image.

13. The radiographic image processing apparatus according to claim 1, wherein abnormality determination algorithms usable by the hardware processor in the determination include an algorithm in which a position of a lung apex is specified from some of the plurality of frame images of the dynamic image, and it is determined based on an amount of change in the specified position of the lung apex whether or not there is an abnormality in the dynamic image.

14. The radiographic image processing apparatus according to claim 1,
wherein abnormality determination algorithms usable by the hardware processor in the determination include an algorithm which includes processing for detecting foreign matter or metal artifacts from some of the plurality of frame images of the dynamic image and it is determined based on a result of the detection whether or not there is an abnormality in the dynamic image.

15. The radiographic image processing apparatus according to claim 1,
wherein abnormality determination algorithms usable by the hardware processor in the determination include an algorithm in which a scapula and a lung field region are recognized from some of the plurality of frame images of the dynamic image, and it is determined based on a positional relationship between the recognized scapula and lung field region whether or not there is an abnormality in the dynamic image.

16. The radiographic image processing apparatus according to claim 1,
wherein abnormality determination algorithms usable by the hardware processor in the determination include an algorithm in which it is determined from some of the plurality of frame images of the dynamic image whether or not there is an abnormality, such as wherein the abnormality includes one or more of body movement of a subject, lung field defect, or excess or deficiency of radiation dose.

17. The radiographic image processing apparatus according to claim 1,
wherein, when the hardware processor determines that there is an abnormality in the dynamic image, the notifier outputs a message or an icon for notifying of the fact.

18. The radiographic image processing apparatus according to claim 1, further comprising:
an operation interface for a user to give an instruction to reject some or all of the frame images of the dynamic image when the hardware processor determines that there is an abnormality in the dynamic image in the determination.

19. A non-transitory computer-readable medium storing a program causing a computer to perform:
acquiring a dynamic image including a plurality of frame images captured by a radiographic imaging apparatus;
determining whether or not there is an abnormality in the dynamic image by using some of the frame images of the acquired dynamic image; and
notifying of a determination result in the abnormality determination;
thinning out the frame images of the dynamic image and determining whether or not there is an abnormality in the dynamic image by using the frame images after the thinning-out; and
determining the number of frame images to be thinned out based on order information regarding capturing of the dynamic image.

\* \* \* \* \*